(12) United States Patent
Kim

(10) Patent No.: US 8,806,082 B2
(45) Date of Patent: Aug. 12, 2014

(54) DIRECT MEMORY ACCESS DEVICE FOR MULTI-CORE SYSTEM AND OPERATING METHOD OF THE SAME

(75) Inventor: Doo Hyun Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 348 days.

(21) Appl. No.: 13/194,160

(22) Filed: Jul. 29, 2011

(65) Prior Publication Data

US 2012/0030382 A1    Feb. 2, 2012

(30) Foreign Application Priority Data

Jul. 29, 2010    (KR) ........................ 10-2010-0073404

(51) Int. Cl.
*G06F 13/28* (2006.01)
*G06F 3/00* (2006.01)
*G06F 5/00* (2006.01)

(52) U.S. Cl.
USPC .................... 710/22; 710/28; 710/36; 710/38

(58) Field of Classification Search
None
See application file for complete search history.

(56) References Cited

U.S. PATENT DOCUMENTS

| | | | |
|---|---|---|---|
| 7,536,669 | B1 | 5/2009 | Anderson |
| 2006/0256796 | A1 * | 11/2006 | Agarwala et al. .......... 370/395.7 |
| 2009/0150576 | A1 | 6/2009 | Madruga et al. |
| 2010/0005470 | A1 | 1/2010 | Simon et al. |

FOREIGN PATENT DOCUMENTS

| | | |
|---|---|---|
| JP | 6-266649 | 9/1994 |
| JP | 2008-298640 | 10/2000 |
| JP | 2008-262315 | 10/2008 |
| KR | 10-2007-0060854 | 6/2007 |
| KR | 10-2009-0091228 | 8/2009 |
| KR | 10-2009-0092835 | 9/2009 |
| KR | 10-0921504 | 10/2009 |
| WO | 2006/012196 A2 | 2/2006 |

OTHER PUBLICATIONS

International Search Report and Written Opinion mailed Feb. 21, 2012 in corresponding International Patent Application PCT/KR2011/005616.
European Search Report for European Patent Application No. 11175970.0 dated Oct. 13, 2011 (in English).

* cited by examiner

*Primary Examiner* — Kris Rhu
(74) *Attorney, Agent, or Firm* — Staas & Halsey LLP

(57) ABSTRACT

A Direct Memory Access (DMA) device for a multi-core system, and an operating method of the DMA device are provided. The DMA device includes a channel state determining unit to determine whether at least one channel among a source channel and a destination channel is available, the source channel being formed between a source core and the DMA device, and the destination channel being formed between a destination core and the DMA device, and a data transmission processing unit to process data of the source core to be transmitted to the destination core, when both the source channel and the destination channel are determined to be available.

23 Claims, 3 Drawing Sheets

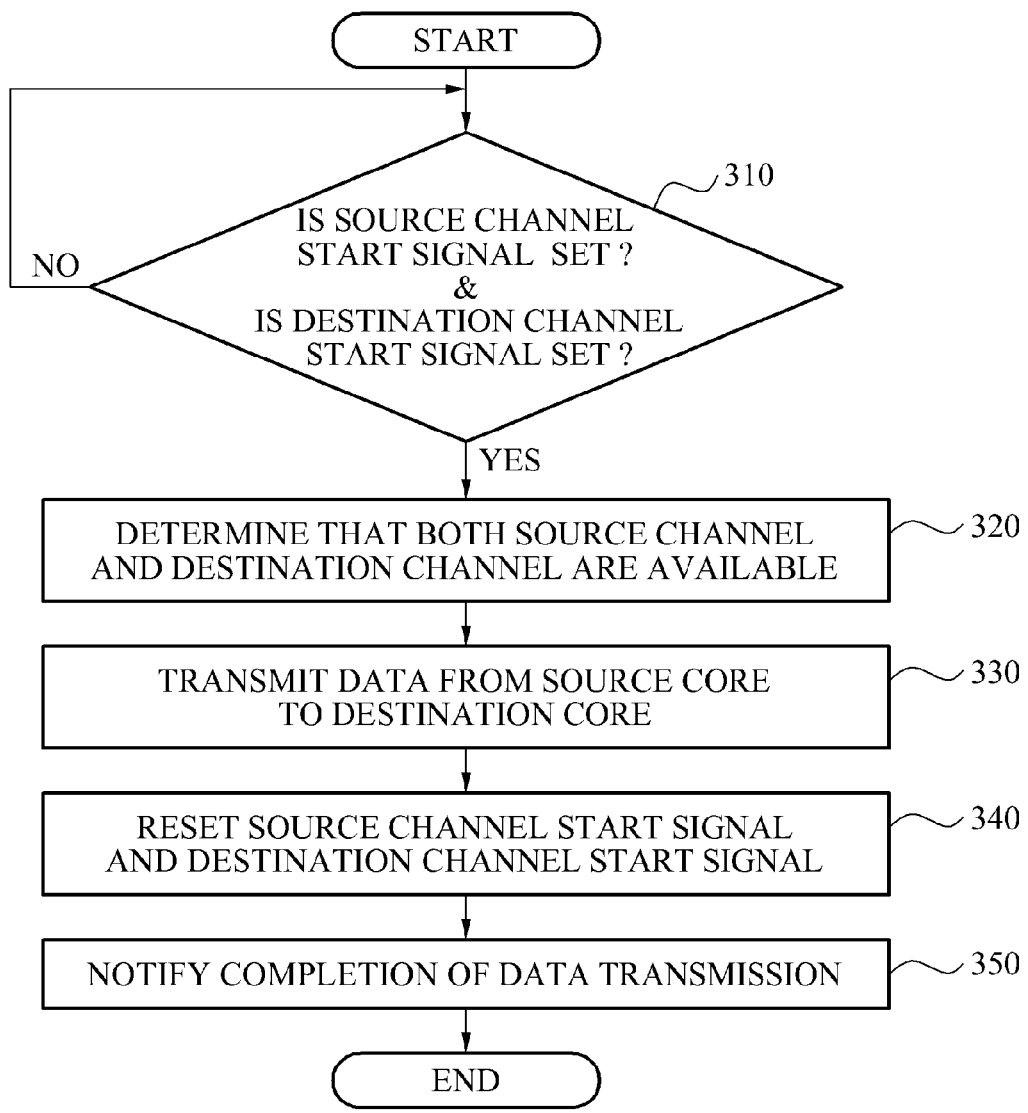

DIRECT MEMORY ACCESS DEVICE FOR MULTI-CORE SYSTEM AND OPERATING METHOD OF THE SAME

CROSS-REFERENCE TO RELATED APPLICATIONS

This application claims the benefit of Korean Patent Application No. 10-2010-0073404, filed on Jul. 29, 2010, in the Korean Intellectual Property Office, the disclosure of which is incorporated herein by reference.

BACKGROUND

1. Field

One or more example embodiments of the following description relate to a Direct Memory Access (DMA) device for a multi-core system, and an operating method of the DMA device that may classify a source channel start signal and a destination channel start signal, and may perform an operation when both the source channel start signal and the destination channel start signal are set, thereby simplifying an implementation of a program and preventing waste of a cycle due to a control.

2. Description of the Related Art

A Direct Memory Access (DMA) device refers to hardware configured to enable parallel data transmission in order to increase a data transmission rate of a Central Processing Unit (CPU).

Generally, most systems including CPUs include DMA devices.

A DMA device has the primary purpose of transmitting data in parallel while the CPU performs a predetermined operation.

When the DMA device is used, a processing time may be saved in an operation of the CPU, and burst transmission may be internally possible, thereby reducing a bus bandwidth.

A basic operating method of the DMA device is simple.

When the CPU sets parameters required to operate the DMA device and starts the DMA device, the DMA device may verify a start signal and the parameters, and may transfer data from a source core to a destination core.

When transfer of the data is completed, the DMA device may set a register, or transmit an interrupt signal to the CPU, in order to notify the CPU of completion of the data transfer. Thus, the DMA device allows certain hardware to access memory relatively independently of the CPU.

Currently, a large number of systems employing CPUs may use a plurality of cores to improve performances of the systems. Such multi-core processors may use DMA for intra-chip data transfers.

SUMMARY

The foregoing and/or other aspects are achieved by providing a Direct Memory Access (DMA) device including a channel state determining unit to determine whether at least one channel among a source channel and a destination channel is available, the source channel being formed between a source core and the DMA device, and the destination channel being formed between a destination core and the DMA device, and a data transmission processing unit to process data of the source core to be transmitted to the destination core, when both the source channel and the destination channel are determined to be available.

The foregoing and/or other aspects are achieved by providing an operating method of a DMA device, including determining that both a source channel and a destination channel are available, when a source channel start signal and a destination channel start signal are respectively set by a source core and a destination core, and processing data of the source core to be transmitted to the destination core, when both the source channel and the destination channel are available.

The foregoing and/or other aspects are achieved by providing a multi-core system including a DMA device, a source core to set a source channel start signal and to notify that a source channel is available, the source channel being formed between the source core and the DMA device, and a destination core to set a destination channel start signal and to notify that a destination channel is available, the destination channel being formed between the destination core and the DMA device, wherein, when the source channel start signal and the destination channel start signal are set, the DMA device processes data of the source core to be transmitted to the destination core.

The foregoing and/or other aspects are achieved by providing a Direct Memory Access (DMA) device. The DMA device includes a register to store mode information required to identify a channel start signal, the channel start signal being requested to be verified, a channel start signal determining unit to determine the channel start signal based on the stored mode information, and a data transmission processing unit to process data of a source core to be transmitted to a destination core, when the determined channel start signal is verified and is set.

The foregoing and/or other aspects are achieved by providing an operating method of a Direct Memory Access (DMA) device. The operating method includes transmitting data from a source core to a destination core when a source channel start signal has been set by a source core indicating that the source core is available and a destination channel start signal has been set by a destination core indicating that the destination core is available.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which:

FIG. 3 illustrates a flowchart of an operating method of a DMA device according to example embodiments.

DETAILED DESCRIPTION

Figure 1:
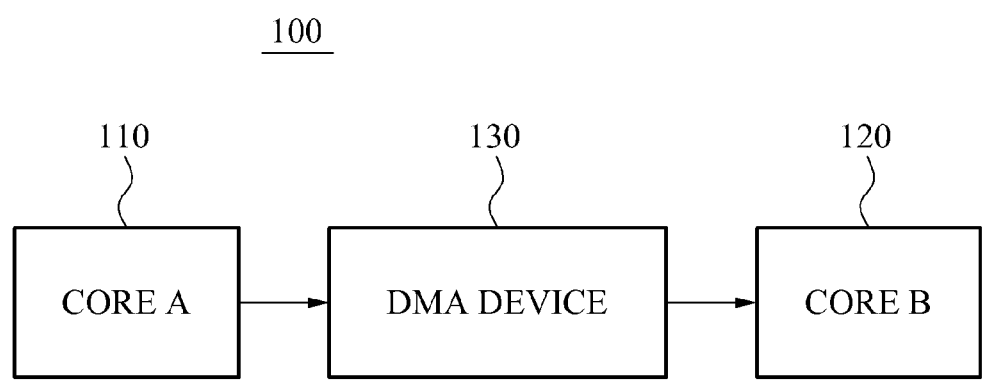
FIG. 1 illustrates a block diagram of a multi-core system to which a Direct Memory Access (DMA) device is applied according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 illustrates a block diagram of a multi-core system 100 to which a Direct Memory Access (DMA) device 130 is applied according to example embodiments.

The multi-core system 100 of FIG. 1 may be interpreted as a Central Processing Unit (CPU).

Referring to FIG. 1, the multi-core system 100 may include, for example, a core A 110, a core B 120, and the DMA device 130. The DMA device 130 may take the form of a stand-alone DMA controller, for example, located on a motherboard, or may be embodied within core A 110 or core B 120, for example.

The core A 110 and the core B 120 may be used to execute a process selected by the multi-core system 100. The multi-core system 100 may further include cores other than the core A 110 and the core B 120.

The core A 110 may be used to transmit data via the DMA device 130, and may be interpreted as a source core. The core B 120 may be used to receive the transmitted data, and may be interpreted as a destination core.

Hereinafter, the core A 110, a "core for transmitting data," and the like may be interpreted as source cores, and the core B 120, a "core for receiving data," and the like may be interpreted as destination cores.

Conventionally, to transmit and receive data between cores, a source core needs to frequently check a state of a destination core, thereby complicating a program implementation. Additionally, it is highly likely to waste a cycle of a particular core due to the necessary control.

Conversely, in example embodiments, the DMA device 130 may individually and independently determine a state of the core A 110 and a state of the core B 120, without a need for the core A 110 to frequently monitor the state of the core B 120, in order to transmit data from the core A 110 to the core B 120.

Accordingly, program implementation may be simplified, and a wait cycle in an idle state where a predetermined core does not perform an operation may be prevented.

For example, when data to be transmitted is stored in the core A 110, the core A 110 may merely notify the DMA device 130 of the existence of the data.

Specifically, to notify the DMA device 130 of the existence of the data, the core A 110 may set a source channel start signal to report availability of a source channel between the core A 110 and the DMA device 130. The reporting of the availability of a source channel between the core A 110 and the DMA device 130 may also be accomplished using a flag, for example.

When the core B 120 notifies the DMA device 130 of the availability of a current channel, independently of the core A 110, data transceiving may be processed.

Specifically, to notify the DMA device 130 of availability of the current channel, the core B 120 may set a destination channel start signal to report availability of a destination channel between the core B 120 and the DMA device 130. The reporting of the availability of a destination channel between the core B 120 and the DMA device 130 may also be accomplished using a flag, for example.

When data to be transmitted is stored in the core A 110, and when the destination channel between the core B 120 and the DMA device 130 is available, the DMA device 130 may transfer the data of the core A 110 to the core B 120.

Specifically, when both the source channel start signal and the destination channel start signal have been set, the DMA device 130 may process the data of the core A 110 to be transmitted to the core B 120.

As a result, the multi-core system 100 to which the DMA device 130 is applied may prevent unnecessary waste of system resources, without a need for the core A 110 to frequently check the state of the core B 120.

Additionally, when the DMA device 130 is employed, system resources may be used efficiently, thereby improving overall performance.

When transmission of the data from the core A 110 to the core B 120 is completed, the DMA device 130 may reset the set source channel start signal and the set destination channel start signal.

Subsequently, when the source channel between the core A 110 and the DMA device 130, and the destination channel between the core B 120 and the DMA device 130 are available, the core A 110 and the core B 120 may again set respective corresponding channel start signals.

Additionally, when transmission of the data from the core A 110 to the core B 120 has been completed, the DMA device 130 may store, in a pending register, data transceiving completion information, and may notify at least one of the core A 110 and the core B 120 of completion of data transmission.

To notify the completion of data transmission, the DMA device 130 may use an interrupt signal.

Specifically, when transmission of the data from the core A 110 to the core B 120 is completed, the DMA device 130 may transmit the interrupt signal to at least one of the core A 110 and the core B 120, to notify the at least one of the core A 110 and the core B 120 of the completion of data transmission.

The DMA device 130 may perform data transmission between the core A 110 and the core B 120, and may also process data transmission between an external memory and one of the core A 110 and the core B 120. Additionally, the DMA device 130 may transmit data unconditionally without a need to check states of other cores.

Accordingly, there may be no need for the DMA device 130 to check both two channel start signals, namely, the source channel start signal and the destination channel start signal.

In other words, the DMA device 130 may set, in a register, mode information regarding whether to check only one or both of the two channel start signals. Here, the register, for example a configuration register, may be used to set a basic control-related signal among DMA control signals.

Specifically, the DMA device 130 may include a register, a channel start signal determining unit, and a data transmission processing unit. The register may store mode information required to identify a channel start signal that is requested to be verified. The channel start signal determining unit may determine the channel start signal based on the stored mode information. The data transmission processing unit may process data of a source core to be transmitted to a destination core, when the determined channel start signal is verified and is set.

Additionally, the channel start signal determining unit may determine, as the channel start signal, either a source channel start signal or a destination channel start signal, based on the stored mode information. Here, the source channel start signal may be set by the source core, and the destination channel start signal may be set by the destination core.

In other words, the channel start signal determining unit may verify only one of the source channel start signal and the destination channel start signal, based on the mode information, and may transmit data without a need to check a state of another core.

Hereinafter, the DMA device 130 will be further described with reference to FIG. 2.

Figure 2:
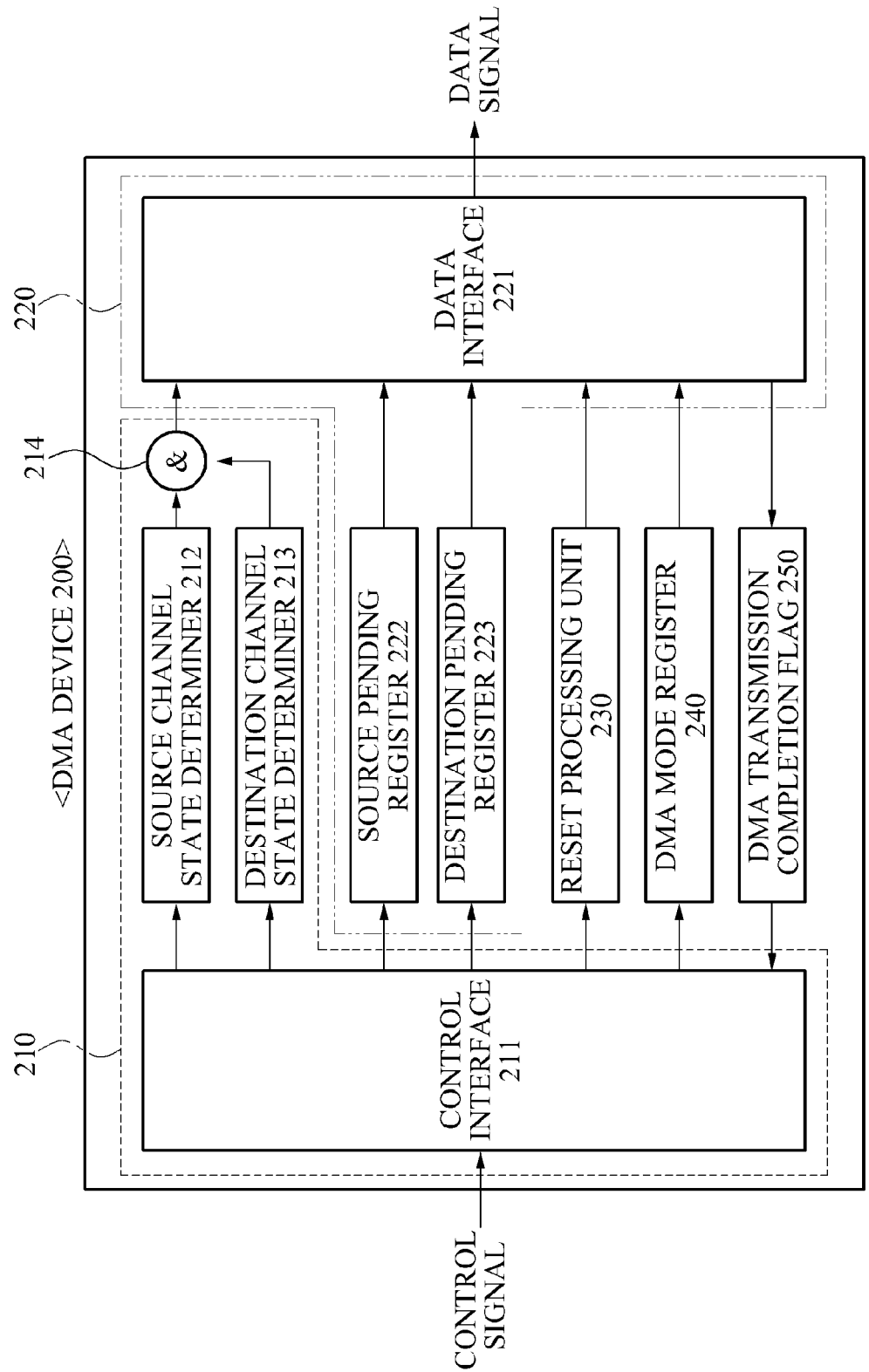
FIG. 2 illustrates a block diagram of a DMA device according to example embodiments.

FIG. 2 illustrates a block diagram of a DMA device 200 according to example embodiments.

Referring to FIG. 2, the DMA device 200 may include, for example, a channel state determining unit 210, and a data transmission processing unit 220.

Specifically, the channel state determining unit 210 may determine whether at least one channel among a source channel and a destination channel is available. Here, the source channel may be formed between the DMA device 200 and a source core, and the destination channel may be formed between the DMA device 200 and a destination core.

When both the source channel and the destination channel have been determined as being available, the data transmission processing unit 220 may process data of the source core to be transmitted to the destination core.

Specifically, the channel state determining unit 210 may include, for example, a control interface 211, a source channel state determiner 212, a destination channel state determiner 213, and an AND operator 214. The data transmission processing unit 220 may include, for example, a data interface 221, a source pending register 222, and a destination pending register 223.

The control interface 211 may receive an input of a control signal from a CPU, to perform a selected operation. Additionally, the control interface 211 may perform a function of distributing parameter values for driving the DMA device 200, and may set a register and a start signal that are required to perform the function.

When a source channel start signal is set by the source core, the source channel state determiner 212 may determine that the source channel is available.

Setting of the source channel start signal may indicate an existence of data to be transmitted from the source core to the destination core.

When a destination channel start signal is set by the destination core at a time independent of the source channel start signal, the destination channel state determiner 213 may determine that the destination channel is available.

Setting of the destination channel start signal may indicate that a memory area of a destination address for the destination core is recordable.

The AND operation 214 may examine the source channel state determiner 212 and the destination channel state determiner 213, and may send a data transmission request to the data interface 221 when both the source channel start signal and the destination channel start signal are set.

In other words, the AND operation 214 may request data transmission when both the source channel start signal and the destination channel start signal are set.

The data interface 221 may transmit the data of the source core to the destination core.

To transmit the data, the data interface 221 may determine that the source channel is available, based on the source channel start signal. The data interface 221 may also determine that the destination channel is available, based on the destination channel start signal.

When the source channel and the destination channel are determined to be available, the data interface 221 may process transmission of the data from the source core to the destination core.

As a result, the DMA device 200 may individually and independently determine the state of the source core and the state of the destination core, may determine a time at which transmission of the data is possible, and may process the data transmission.

The DMA device 200 may further include a reset processing unit 230 to reset the source channel start signal and the destination channel start signal, when transmission of the data from the source core to the destination core is completed since both the source channel and the destination channel are then available.

The data transmission processing unit 220 may further include a pending register including a source pending register 222 and a destination pending register 223.

The DMA device 200 may notify each of the source core and the destination core of completion of data transmission from the source core to the destination core.

The data transmission processing unit 220 may notify the source core of the completion of data transmission via the source pending register 222.

Specifically, when transmission of the data to the destination core is completed, the data transmission processing unit 220 may store data transmission completion information in the source pending register 222.

Subsequently, the source core may verify the completion of data transmission, based on the data transmission completion information stored in the source pending register 222.

Similarly, the data transmission processing unit 220 may notify the destination core of the completion of data transmission via the destination pending register 223.

Specifically, when transmission of the data to the destination core is completed, the data transmission processing unit 220 may store data reception completion information in the destination pending register 223.

Subsequently, the destination core may verify the completion of data transmission, based on the data reception completion information stored in the destination pending register 223.

In other words, the source core and the destination core may verify that the data transmission is successfully processed, via the source pending register 222 and the destination pending register 223, respectively.

When transmission of the data from the source core to the destination core is completed, the data transmission processing unit 220 may report the completion of data transmission to at least one of the source core and the destination core.

The DMA device 200 may further include a DMA mode register 240, and a DMA transmission completion flag 250, as shown in FIG. 2. The DMA mode register 240 may store a current mode of the DMA device 200. The DMA transmission completion flag 250 may be used to store data transceiving completion information in the source pending register 222 and the destination pending register 223.

FIG. 3 illustrates a flowchart of an operating method of a DMA device according to example embodiments.

In operation 310, whether a source channel and a destination channel are available may be determined.

Specifically, a determination may be made on whether a source channel start signal and a destination channel start signal are set and accordingly, the source channel and the destination channel may be determined to be available.

The source channel start signal may be set by receiving a control signal from a source core when data to be transmitted is stored in the source core.

The destination channel start signal may be set by receiving a control signal from a destination core when the destination core is ready to receive data.

The source channel start signal and the destination channel start signal may be set individually and independently of each other.

In other words, when data to be transmitted is stored in the source core, the source core may set the source channel start signal, without a need to check a state of the destination core.

Additionally, when a current channel is available, the destination core may set the destination channel start signal, without a need to check a state of the source core.

When both the source channel start signal and the destination channel start signal are set in operation 310, both the source channel and the destination channel may be determined to be available in operation 320.

When both the source channel and the destination channel are available, the data of the source core may be controlled to be transmitted to the destination core in operation 330.

When transmission of the data from the source core to the destination core is completed since both the source channel and the destination channel are available, the source channel start signal and the destination channel start signal may be reset in operation 340.

When the transmission of the data from the source core to the destination core is completed, at least one core among the source core and the destination core may be notified of completion of data transmission in operation 350.

To notify the at least one core of the completion of data transmission, registers respectively corresponding to the source core and the destination core may be used, or an interrupt signal may be used.

As described above, using the operating method of the DMA device according to example embodiments, it is possible to simply implement a program, and to prevent waste of a cycle due to a control, without a need for a core for transmitting data to check a state of a core for receiving data.

Additionally, system resources may be efficiently used and thus, it is possible to improve the overall performance of a CPU.

The operating method of the DMA device according to the above-described example embodiments may be recorded in non-transitory processor-readable media or computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts.

Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. The methods described herein may be executed on a general purpose computer or processor or may be executed on a particular machine such as the multi-core system or DMA device described herein. Any one or more of the software modules described herein may be executed by a dedicated processor unique to that unit or by a processor common to one or more of the modules.

According to example embodiments, it is possible to prevent unnecessary waste of system resources, without a need for a core for transmitting data to frequently check a state of a core for receiving data.

Additionally, according to example embodiments, it is possible to easily implement a program and to prevent waste of a cycle due to a control, without a need for a core for transmitting data to check a state of a core for receiving data.

Furthermore, according to example embodiments, system resources may be efficiently used and thus, it is possible to improve the overall performance of a CPU.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A Direct Memory Access (DMA) device, comprising:
a channel state determining unit to determine whether at least one channel among a source channel and a destination channel is available, the source channel being formed between a source core and the DMA device, and the destination channel being formed between a destination core and the DMA device; and
a data transmission processing unit to transmit data of the source core to the destination core when both the source channel and the destination channel are determined to be available,
wherein the channel state determining unit comprises:
a source channel state determiner to determine that the source channel is available, when a source channel start signal is set by the source core,
wherein the source core sets the source channel start signal when data to be transmitted is stored.

2. The DMA device of claim 1, wherein the channel state determining unit comprises:
a destination channel state determiner to determine that the destination channel is available, when a destination channel start signal is set by the destination core.

3. The DMA device of claim 2, wherein the channel state determining unit determines that transmission of the data is possible, when both the source channel start signal and the destination channel start signal are set.

4. The DMA device of claim 2, further comprising:
a reset processing unit to reset the source channel start signal and the destination channel start signal, when transmission of the data from the source core to the destination core is completed.

5. The DMA device of claim 2, wherein the source channel start signal and the destination channel start signal are set at different times with respect to each other.

6. The DMA device of claim 1, wherein the data transmission processing unit comprises a pending register to store data transceiving completion information, when transmission of the data from the source core to the destination core is completed.

7. The DMA device of claim 5, wherein, when transmission of the data from the source core to the destination core is completed, the pending register comprises:
a source pending register to store data transmission completion information; and
a destination pending register to store data reception completion information.

8. The DMA device of claim 1, wherein the data transmission processing unit transmits an interrupt signal reporting a data transmission completion to at least one core among the source core and the destination core, when transmission of the data from the source core to the destination core is completed.

9. An operating method of a Direct Memory Access (DMA) device, the method comprising:

determining that both a source channel and a destination channel are available, when a source channel start signal and a destination channel start signal are respectively set by a source core and a destination core, wherein the source core sets the source channel start signal when data to be transmitted is stored; and transmitting data of the source core to the destination core when both the source channel and the destination channel are determined as available.

10. The method of claim 9, further comprising:

resetting the source channel start signal and the destination channel start signal, when transmission of the data from the source core to the destination core is completed.

11. The method of claim 10, further comprising:

notifying at least one core among the source core and the destination core of a data transmission completion, when transmission of the data from the source core to the destination core is completed.

12. The method of claim 9, wherein the source channel start signal and the destination channel start signal are set at different times from each other.

13. A multi-core system, comprising:

a Direct Memory Access (DMA) device;

a source core to set a source channel start signal to notify that a source channel is available, the source channel being formed between the source core and the DMA device; and a destination core to set a destination channel start signal to notify that a destination channel is available, the destination channel being formed between the destination core and the DMA device, wherein the source core sets the source channel start signal when data to be transmitted is stored, and when the source channel start signal and the destination channel start signal are determined as set, the DMA device transmits data of the source core to the destination core.

14. The multi-core system of claim 13, wherein the DMA device resets the set source channel start signal and the set destination channel start signal, when transmission of the data from the source core to the destination core is completed.

15. The multi-core system of claim 13, wherein the DMA device stores data transceiving completion information in a pending register, and notifies at least one core among the source core and the destination core of a data transmission completion, when transmission of the data from the source core to the destination core has been completed.

16. The multi-core system of claim 13, wherein the DMA device notifies, through an interrupt signal, at least one core among the source core and the destination core of a data transmission completion, when transmission of the data from the source core to the destination core is completed.

17. The multi-core system of claim 13, wherein the source channel sets the source channel start signal at a different time than the destination channel sets the destination channel start signal.

18. The multi-core system of claim 13, wherein the source core need not check a state of the destination core before setting the source channel start signal.

19. A Direct Memory Access (DMA) device, comprising:

a register to store mode information required to identify a channel start signal, the channel start signal being requested to be verified;

a channel start signal determining unit to determine the channel start signal based on the stored mode information; and a data transmission processing unit to process data of a source core to be transmitted to a destination core, when the determined channel start signal is verified and is set, wherein the channel start signal determining unit comprises:

a source channel state determiner to determine that the source channel is available when a source channel start signal is set by the source core, wherein the source core sets the source channel start signal when data to be transmitted is stored.

20. The DMA device of claim 19, wherein the channel start signal determining unit determines, as the channel start signal, either a source channel start signal or a destination channel start signal, based on the stored mode information, the source channel start signal being set by the source core, and the destination channel start signal being set by the destination core.

21. An operating method of a Direct Memory Access (DMA) device, the method comprising:

transmitting data from a source core to a destination core when a source channel start signal has been set by a source core indicating that the source core is available and a destination channel start signal has been set by a destination core indicating that the destination core is available, wherein the source core sets the soruce channel start signal when data to be transmitted is stored.

22. The method of claim 21, wherein the source channel start signal and the destination channel start signal are set at different times with respect to each other.

23. The method of claim 21, wherein the source core need not monitor a state of the destination core.

* * * * *

UNITED STATES PATENT AND TRADEMARK OFFICE
CERTIFICATE OF CORRECTION

PATENT NO. : 8,806,082 B2  
APPLICATION NO. : 13/194160  
DATED : August 12, 2014  
INVENTOR(S) : Doo Hyun Kim Page 1 of 1

It is certified that error appears in the above-identified patent and that said Letters Patent is hereby corrected as shown below:

In the Claims

Column 10, Line 42, In Claim 21, delete "soruce" and insert -- source --, therefor.

Signed and Sealed this  
Twenty-third Day of December, 2014

Michelle K. Lee  
*Deputy Director of the United States Patent and Trademark Office*